(12) United States Patent
Nindl et al.

(10) Patent No.: US 9,046,361 B2
(45) Date of Patent: Jun. 2, 2015

(54) TARGET POINT RECOGNITION METHOD AND SURVEYING INSTRUMENT

(75) Inventors: Daniel Nindl, Innsbruck (AT);
Hans-Martin Zogg, Uttwil (CH);
Werner Lienhart, Graz (AT); Norbert Kotzur, Altstaetten (CH)

(73) Assignee: LEICA GEOSYTEMS AG, Heerbrugg (CH)

( * ) Notice: Subject to any disclaimer, the term of this patent is extended or adjusted under 35 U.S.C. 154(b) by 359 days.

(21) Appl. No.: 13/515,438

(22) PCT Filed: Jul. 7, 2011

(86) PCT No.: PCT/EP2011/061500
§ 371 (c)(1),
(2), (4) Date: Jun. 12, 2012

(87) PCT Pub. No.: WO2012/004342
PCT Pub. Date: Jan. 12, 2012

(65) Prior Publication Data
US 2012/0249783 A1    Oct. 4, 2012

(30) Foreign Application Priority Data
Jul. 7, 2010    (EP) .................................... 10168772

(51) Int. Cl.
*G01C 15/00*    (2006.01)
*G01C 1/04*    (2006.01)

(52) U.S. Cl.
CPC ................ *G01C 15/002* (2013.01); *G01C 1/04* (2013.01)

(58) Field of Classification Search
None
See application file for complete search history.

(56) References Cited

U.S. PATENT DOCUMENTS 7,209,221 B2 *    4/2007    Breed et al. ................... 356/5.02
7,477,758 B2 *    1/2009    Piirainen et al. .............. 382/100
(Continued)

FOREIGN PATENT DOCUMENTS

CN    1856693 A    11/2006
CN    1973180 A    5/2007
(Continued)

OTHER PUBLICATIONS

Bhanu, "Automatic Target Recognition: State of the Art Survey," IEEE Trans. on Aerospace and Electronic Systems, vol. AES-22, No. 4, Jul. 1986, pp. 364-379.*
International Search report mailed Aug. 16, 2011 in International Patent Application No. PCT/EP2011/061500.
Extended European Search Report dated Feb. 24, 2011 as received in application No. 10168772.1.

*Primary Examiner* — Jay Patel
*Assistant Examiner* — Reza Aghevli
(74) *Attorney, Agent, or Firm* — Maschoff Brennan

(57) ABSTRACT

Target point recognition method including emitting electromagnetic radiation to illuminate targets, moving the scanning beam within a predetermined angular range in order to scan the surveying environment, detecting reflections of the electromagnetic radiation on the targets, wherein the targets are defining the target points, and determining the angle to the target points. The method further including a capturing procedure with capturing an overall image of the surveying environment, wherein the overall image comprises at least one single image taken by the camera, and determining target points and their angle on the overall image by image processing by matching targets with one or more predetermined search criteria, storing the target points together with their angle a data base, and displaying the overall image together with marks for indicating a position of the target points detected within the scanning procedure and the capturing procedure in the overall image.

18 Claims, 3 Drawing Sheets

(56) References Cited

U.S. PATENT DOCUMENTS

| | | | |
|---|---|---|---|
| 2005/0046584 A1* | 3/2005 | Breed | 340/825.72 |
| 2005/0099637 A1* | 5/2005 | Kacyra et al. | 356/601 |
| 2007/0064246 A1 | 3/2007 | Braunecker et al. | |
| 2008/0205707 A1* | 8/2008 | Braunecker et al. | 382/106 |
| 2009/0092284 A1* | 4/2009 | Breed et al. | 382/103 |
| 2010/0141775 A1* | 6/2010 | Vogel | 348/187 |
| 2011/0032507 A1 | 2/2011 | Braunecker et al. | |
| 2011/0285592 A1 | 11/2011 | Green et al. | |

FOREIGN PATENT DOCUMENTS

| | | |
|---|---|---|
| EP | 1681533 | 7/2006 |
| EP | 2141450 | 1/2010 |
| EP | 2194399 | 6/2010 |

* cited by examiner

◆ Retro-reflective targets
● Pattern recognition (church towercross)
✢ Active (signal-emitting) target

TARGET POINT RECOGNITION METHOD AND SURVEYING INSTRUMENT

FIELD OF THE INVENTION

The invention relates to a target point recognition method and to a surveying instrument suitable to perform such a target point recognition method.

BACKGROUND

In surveying it is known to use so called total stations for certain surveying methods. Therefore, the transformation of measurement data into an existing coordinate system is required. Such a transformation, for instance, can be done via measurement points that are already known beforehand.

At present different laser signals are used for finding target points. While the surveying instrument moves, a horizontal position of a target point is detected with a first laser signal. Thereafter, a fine search is performed by using a different laser signal.

There is need for a method capable to fast and reliably determine all available target points of a surveying environment fast and securely, as well as for a surveying instrument capable to perform the method.

SUMMARY

According to the invention, a target point recognition method for an automatic search of target points in a surveying environment in advance of a precise measurement of these points is provided, wherein an angle, in particular a horizontal and a vertical angle, to the target points is measured with a surveying instrument. Therein, the surveying instrument comprises means for measuring angles, a camera and processing means for data storing and controlling the following steps in an automated manner after starting the search:
  a scanning procedure with
    emitting electromagnetic radiation in form of a scanning beam, in particular in the form of a laser fan, to illuminate targets,
    moving the scanning beam within a predetermined angular range in order to scan the surveying environment,
    detecting reflections of the electromagnetic radiation on the targets, wherein the targets are defining the target points, and
    determining the angle to the target points,
  a capturing procedure with
    capturing an overall image of the surveying environment, wherein the overall image comprises at least one single image taken by the camera, in particular comprising several images stitched together to a panoramic view, and
    detecting target points and determining their angle on the overall image by image processing by matching targets with one or more predetermined search criteria,
  storing the target points together with their angle in a data base, and
  displaying the overall image together with marks for indicating a position of the target points detected within the scanning procedure and the capturing procedure in the overall image.

Furthermore, the invention also relates to a surveying instrument, in particular a total station, comprising display means, a distance measuring unit, an angle determination unit, a camera for capturing images, and a processing unit for image processing, data storing and providing a searching functionality for searching for target points, that are defined by targets, and measuring an angle, in particular a horizontal and a vertical angle, to the target points in advance of a precise measurement of these target points. Therein—within the searching functionality—the processing unit is adapted to perform and control the following steps in an automated manner:
  a scanning procedure by use of scanning means with
    emitting electromagnetic radiation in form of a scanning beam, in particular in the form of a laser fan, to illuminate targets,
    moving the scanning beam within a predetermined angular range in order to scan the surveying environment,
    detecting reflections of the electromagnetic radiation on the targets, wherein the targets are defining the target points, and
    determining the angle to the target points,
  a capturing procedure with
    capturing an overall image of the surveying environment, wherein the overall image comprises at least one single image taken by the camera, in particular comprising several images stitched together to a panoramic view, and
    detecting target points and determining their angle on the overall image by image processing by matching targets with one or more predetermined search criteria,
  storing the target points together with their angle in a data base, and
  displaying the overall image together with marks for indicating a position of the target points detected within the scanning procedure and the capturing procedure in the overall image.

Especially, the scanning means may comprise an electromagnetic radiation emitter for emitting a scanning beam, moving means for moving the scanning beam, a reflections detector for detecting reflections on the targets.

Particularly, with other words, according to the invention, a target point recognition method comprises the steps of scanning a predetermined surveying environment, determining a possible target point, by matching the possible target point with predetermined search criteria, and storing the determined target point together with determined target point information in a data base. The determination of target points that are defined by targets, i.e. retro-reflecting targets or active targets, can be performed by a scanning procedure using a laser spread over a defined range forming a scanning beam, in particular in the form of a fan, and detecting reflections on targets and/or can be done by a capturing procedure using an image processing method after an image of the surveying environment is taken with a camera. By matching predefined pattern to the captured image additional targets can be determined. Performing of these steps is continued over the whole surveying environment. Both methods can be carried out at least partly overlapping in time and all determined targets or marks indicating the targets' position can be displayed on a display together with the image of the surveying environment.

According to the target point recognition method of the invention and comparing it to prior art methods, an advantage is the possibility to recognize all targets and their target points, respectively, being in reach of the surveying instrument very fast within one initial process. Retro-reflecting targets are determined as well as signal-emitting targets or targets matching to a predefined pattern on an image. Furthermore, the determined and verified target points are stored in a data base for later use, in particularly for a precise measurement of angles and distance to the points. The capturing procedure, the scanning procedure, the data storing and the displaying may be controlled by processing means. Additionally, on the basis of information data of target points already known beforehand, it is possible to incorporate all found target points into an existing or into a new coordinate system and to display the target points in combination with an image corresponding to the surveying environment. Single target points can be added or deleted to or from the data base and with it a succeeding precise measurement can be performed faster.

The execution of the recognition method should be explained roughly by means of one example. One wants to detect retro-reflecting targets and signal-emitting targets in a landscape. A surveying instrument, e.g. a total station, is positioned in the field and the target point recognition method is executed by pressing a button on the instrument or on a controller that is wirelessly connected to the instrument. After it, the instrument starts to scan the environment over a 360° angle or any other defined angular range with a laser fan and an automated target recognition sensor (ATR-sensor). Moreover, an image of the scanned environment is captured and an image processing method is further used for recognizing the top of a church tower as a target. Within this scan most of the targets are detected and their positions are displayed together with a panoramic image on the scanned environment. The user of the instrument defines an area on a display, in that a target is located but was not detected, yet, and the user starts the scan with other searching criteria in this area again. After the missing target was recognized now, the panoramic image together with all target points, each representing a target, is displayed. The user now chooses three points on the display he is interested in and starts a precise measurement of these points. The surveying instrument is directed automatically onto the selected points and performs the determination of the coordinates of these targets.

In reach in the sense of the invention means not only visible by optical means, but can also pertain to non visible target points. Recognition of such target points can be based on acoustic and/or electromagnetic waves, e.g. on sound waves, ultra sound waves, radio waves.

Particularly, the surveying environment can be scanned up to a 360° angle or up to a 180° angle for providing a panorama image or a partial hemisphere, in particular a full dome.

Furthermore, predetermined search criteria can be defined and merely target points fulfilling the search criteria are verified. Thereby, particularly it is possible to exclude certain kinds of target points from the recognition process. Thereby a faster scanning and recognition of the desired kinds of target points is possible. The search criteria may be adapted to different sensors that are used with the recognition method.

Particularly, furthermore, the determined target points can be displayed on a display. Thereby further processing of the target points by a user of the surveying instrument is possible. Especially it can be useful, if the determined and verified target points are displayed in combination with a virtual environment and/or in combination with an image of the surveying environment. Thereby, the target points and their relation to the surveying environment or their position in the surveying environment can be displayed.

Furthermore, it can be advantageous, if the target points are displayed by using different symbols or marks. Depending on the sensor or the channel a target point is determined with, a corresponding mark can be used and, further, depending on the search criteria used for determining the respective target point other corresponding symbols can be used. Thus, particularly, it is facilitated to determine the kind of the target point on the display means. In addition, more information, e.g. pole height or reflector type, may be extracted from the image or determined on basis of backscattered pulses.

It can be especially advantageous, if the size of a symbol used for representing the target point depends on the respective target points' distance from the used surveying instrument, i.e. the nearer a target point is to the surveying instrument, the bigger a mark representing this point is displayed.

That means that the scanning procedure and the capturing procedure may be—as sub-procedures—part of a recognition process for detecting the target points, wherein the recognition process may further comprise other sub-procedures, in particular wherein the sub-procedures are performed by use of different sensor types, in particular an automatic-target-recognition-sensor, an over-view camera, an on-axes camera, a thermographical sensor and/or a range imaging module. Furthermore, the target points may be displayed in combination with a virtual environment and/or in combination with the overall image of the surveying environment, wherein the target points may be displayed by using different marks in dependency of the sub-procedure of the recognition process with which the target point has been recognised, especially in dependency of the search criteria used for determining the respective target point, in particular wherein the size of the representing marks may depend on the respective target points' distance from the surveying instrument.

Additionally, it can be advantageous to manually verify possible target points. These can then be added to the data base. Thus, it is possible to define additional target points. Additionally or alternatively, some or all verified target points can be manually chosen and then removed from the data base. Thus, target points not necessary for the surveying task to be performed can be excluded. For instance, it might be useful to pick only one target point from a group of closely arranged and similar target points. Thereby, choosing a wrong target point in a later stage of the surveying process can be avoided.

In order to perform the above mentioned manual control, control means such as a keyboard, a control stick, a touch display or a combination thereof can be provided at the surveying instrument and/or at a remote control for the surveying instrument.

Particularly, the scanning of the surveying environment can be performed by laser signals. Alternatively scanning by light signals, optical or opto-electronic scanning or any combination of some or all of these scanning techniques can be performed.

Particularly, target point information of some or all of the verified target points can be transferred into an existing coordinate system. Thereby, the processing of the found target points can be advanced.

Particularly, furthermore, the search criteria are chosen to enable verification whether a target point is a retro-reflecting target and/or a signal-emitting target and/or a target representing a predetermined structure or pattern and/or a temporarily-signalized target and/or a coded target and/or a half-corresponding target. These are some of the most common possible kinds of targets. However, the search criteria can be chosen to fit any arbitrary kind of target point.

Particularly, the scan within the target point recognition method can be repeated several times by using different types of sensors or search criteria. In case of a first sensor is not able to recognize a type of a target correctly another sensor or other search criteria may be used in an additional scan suited for the target type.

A surveying instrument according to the invention comprises scanning means which are designed to scan a surveying environment and determining means which are designed to determine one or more possible target points in the scanned surveying environment. Furthermore, verifying means are provided to verify whether the one or the more possible target points matches with one or more predetermined search criteria. Thereafter, the determined and/or verified target points together with target point information are stored in storing means.

Furthermore, the surveying instrument may comprise image capturing means, e.g. a camera, for capturing an image of the scanned surveying environment. It can comprise display means for displaying the measuring environment virtually, e.g. as a sphere or a CAD environment, and/or in the form of an image as well. Thereby, particularly an image of the surveying environment together with the determined target points can be displayed on the display means. With additional operating means for manually selecting and/or deselecting target points a user of the surveying instrument might then manually add further target points or remove unwanted target points from the data base.

That means that the surveying instrument, in particular a total station, comprises display means, scanning means for emitting electromagnetic radiation in form of a scanning beam and for detecting reflections, a distance measuring unit, an angle determination unit, a camera for capturing images, a processing unit for image processing, data storing and providing a searching functionality for searching for target points, that are defined by targets, and measuring an angle, in particular a horizontal and a vertical angle, to the target points in advance of a precise measurement of these target points, wherein—within the searching functionality—the processing unit is adapted to perform respectively control a recognition process in an automated manner.

A surveying instrument according to the invention particularly enables to scan the whole surveying environment and automatically determines target points if they correspond to predetermined search criteria. The determination of target points can be done with a sensor scanning a surveying environment and determining reflections of electromagnetic radiation for target identification and/or can be performed by image processing methods on an overall image of the surveying environment, wherein the overall image can be stitched from at least two partial images of the environment. Thereafter, it may be verified whether the target points are true target points. These verified target points can then be stored together with corresponding target point information such as distance, angle, and elevation etc. of the respective target point with regard to the surveying instrument. The overall image may be displayed on display means together with marks for indicating the positions of the target points in the image.

Particularly, the scanning means may comprise one or more laser scanners.

Among the sensors used for the method can be at least a sensor intend for the scanning procedure with emitting electromagnetic radiation spread over a defined range forming a scanning beam, in particular in the form of a fan, moving the scanning beam within an angular range in order to scan the surveying environment, detecting reflections of the electromagnetic radiation on the targets and determining a rough angle, in particular the horizontal and the vertical angle, to the target points (power-search-sensor) in advance of a precise measurement. Additionally, an over-view camera with a low or no magnification factor and thereby comprising a large field of view or an ATR-sensor (automatic target recognition sensor) can be used. For an ATR-detection radiation is emitted in the direction of an aiming axis, is reflected at a prism and detected by the ATR-sensor. According to the position the reflected radiation hits the sensors the direction to the target can be determined.

Further the surveying environment can be defined by moving the fanned radiation over a predetermined angular range with the scanned area corresponding to the surveying environment. On the other hand, a defined surveying environment can be scanned by adapting the movement of the fan to an angular range of the surveying environment.

BRIEF DESCRIPTION OF THE DRAWINGS

Other advantages and details of the invention will be appreciated from the following description of presently preferred embodiments together with the attached drawings.

In the drawings.

DETAILED DESCRIPTION

Presently preferred embodiments of the invention will be described on the basis of the Figures.

Figure 1:
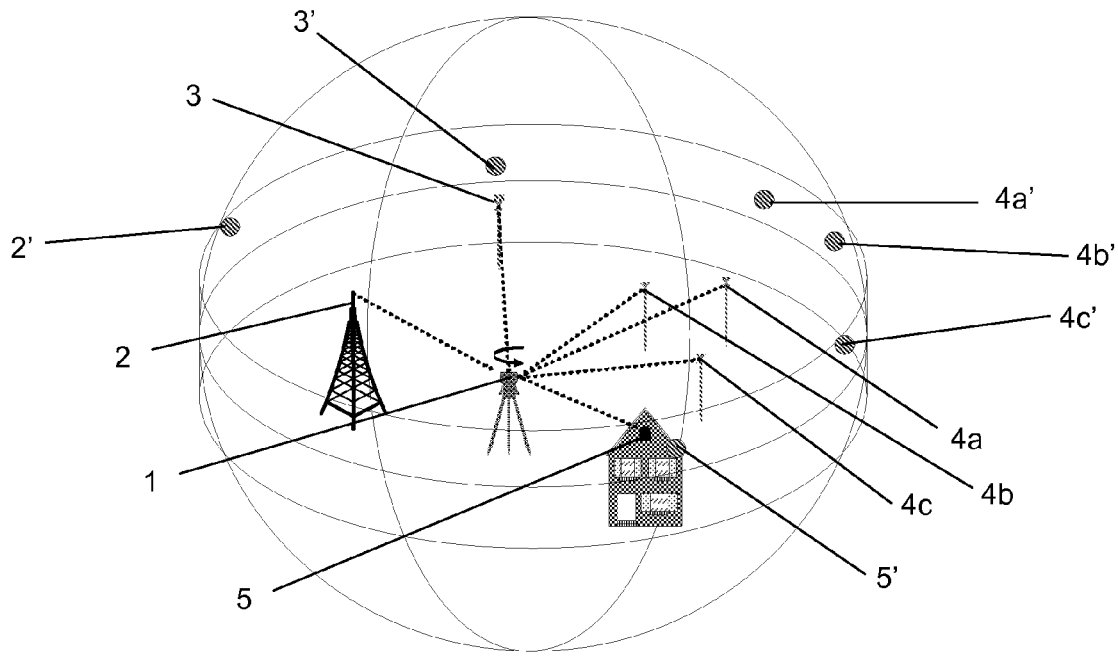
FIG. 1 is a schematic view of a principle of a search process for target points and subsequent representation of the found target points.

FIG. 1 is a schematic view of a principle of a search process for target points and subsequent representation of the found target points. A surveying instrument 1 according to the invention is placed in a surveying environment. Thereafter, an initial scan is triggered. The scan may be performed with a 360° angle in order to provide a full panoramic view.

During the scan, various sensors provided in the surveying instrument 1 provide signals to a controller. Among the sensors used can be an over-view camera, a power-search-sensor (PS-sensor) capable to recognize reflected signals and/or an automatic-target-recognition-sensor (ATR-sensor). Based on the signals from the respective sensor, by using predetermined search criteria, the controller verifies whether a scanned point is a target point. For instance, if the over-view camera provides an image signal of the tip of the power mast 2, by using picture recognizing software, the controller verifies whether the image corresponds to one of plural image patterns stored in a data base, that is, to the pattern of a power mast tip (capturing procedure). Thereafter, the target point is stored in a data base, and is presented on a display which is provided at the total station. Depending on the kind of the target point, the target point symbol on the display varies.

Due to the various search criteria stored in the data base, the controller is capable to recognize plural different kinds of targets such as signal emitting targets 3, retro reflective targets 4a, 4b, 4c or remarkable objects in the surveying environment such a house gable 5, a church cross, the power mast tip 2, a window corner etc.

In FIG. 1 the verified target points 2', 3', 4a', 4b', 4c', 5' corresponding to their targets 2, 3, 4a, 4b, 4c, 5 are presented in a virtual surveying environment which has the form of a sphere.

Figure 2:
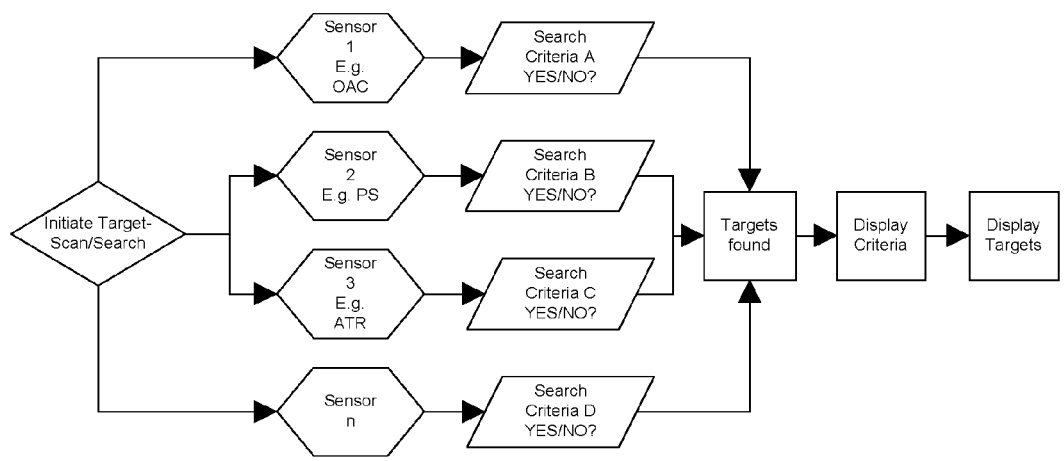
FIG. 2 is a schematic chart of a target point finding process according to the invention.

FIG. 2 is a schematic chart showing a target point finding process according to an embodiment of the invention.

According to this embodiment, after initiating the target search the surveying environment is scanned by a first sensor being a CCD-sensor of an on-axis-camera, a second sensor being a PS-sensor, and an automatic-target-recognition-camera-sensor (ATR-sensor). In FIG. 2, other sensors which can be used with the method and surveying instrument according to the invention are represented by Sensor n.

In a next step, the signals received from these sensors are verified with regard to predetermined search criteria A, B, C or D. If one of these search criteria is fulfilled, the respective target point together with information pertaining the target points' distance, elevation, angle, etc. is stored in a data base. The value for this angle may not be a precise value but a result of a rough measurement in advance of a precise measurement. Depending on the fulfilled search criteria, the kind of the target point is stored as well.

Since the surveying instrument in addition to a CCD-sensor can be provided with a PS-sensor or an ATR-sensor, the position of retro-reflective targets can be determined.

Among the most common target points there are retro-reflecting targets, signal-emitting targets and temporarily signalized targets such as an object onto which a laser dot is projected, which all can be detected using the scanning procedure, further, targets representing a certain structure or pattern such as church crosses, window corners, power line masts, and half-corresponding targets such as a normal sticker that is not reflective, that can be determined with the capturing procedure and, moreover, there are coded targets such as a retro-reflecting target combined with, e.g. a bar code, which can be determined with both procedures.

In addition to storing the verified target point, the target point is displayed on display means of the surveying instrument depending on predetermined displaying criteria. For displaying a virtual presentation as the one in FIG. 1 or an image presentation as the one in FIG. 3 are presently preferred.

Figure 3:
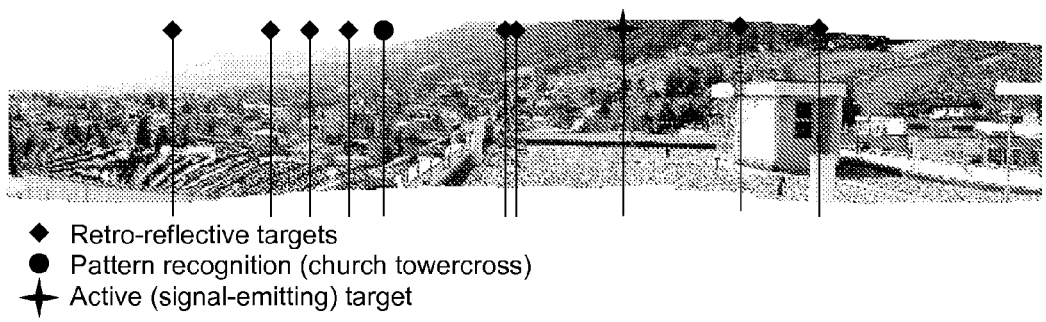
FIG. 3 is an image of a surveying environment with a representation of different target point types.

FIG. 3 shows an image of a surveying environment with a representation of different target point types. An overview picture of the surveying environment is shown, which is provided by an overview camera mounted on the surveying instrument, into which symbols representing the verified target points are incorporated. In the image of FIG. 3, three different kinds of target points are visualized, that is, retro-reflecting targets marked by a diamond symbol, a church cross marked by a full circle, which was recognized by pattern recognition, and an active, that is, a signal emitting target marked by a four pointed star.

Figure 4:
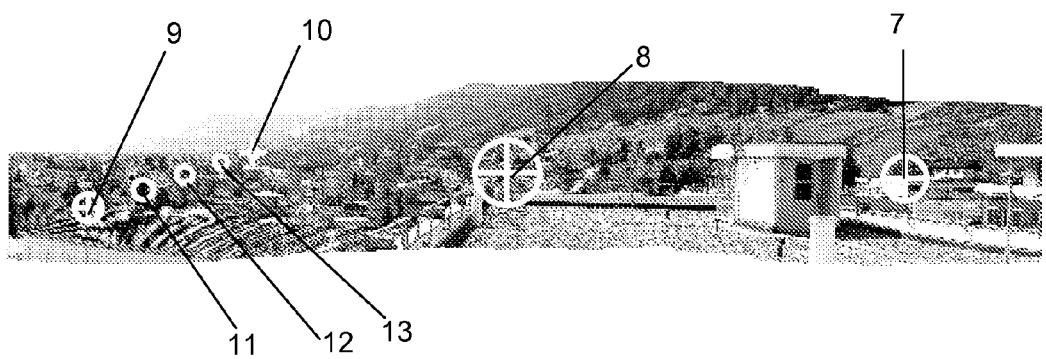
FIG. 4 is an image of the surveying environment of FIG. 3 with a representation of different target points depending on their distance.

FIG. 4 shows another kind of presentation. In FIG. 4 the verified target points are marked by reticles 7, 8, 9, 10 or by circles 11, 12, 13. Furthermore, the size of the reticles 7, 8, 9, 10 or circles 11, 12, 13 corresponds to the distance of the respective target points. That is, the closer the target point is located, the larger is the size of the reticle or circle, while more distant target points are represented by smaller reticles or circles. The target points may be detected over a whole defined surveying environment and/or within a predefined surveying area. Additionally, an area may be defined comprising all detected target points or comprising one type of target point in order to perform a precise measurement of these points.

Figure 5:
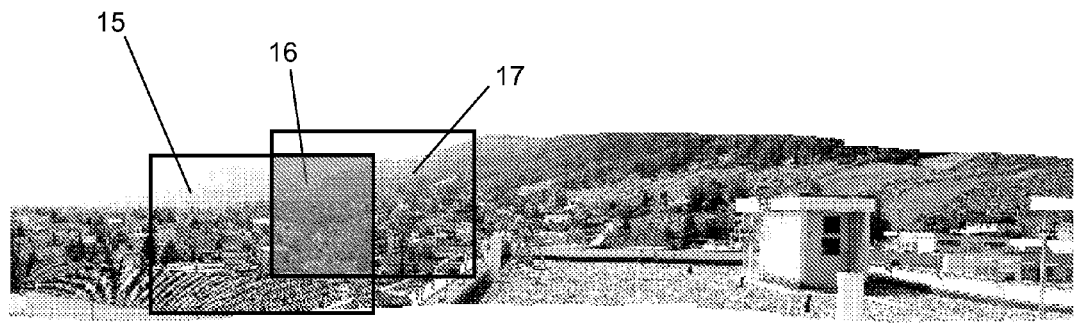
FIG. 5 is an image of the surveying environment of FIG. 3 with a selection/deselection mask for manually selecting or deselecting target points.

In FIG. 5 two rectangle frames 15, 17 are shown, wherein the position of the frames can be controlled by a user. The size of these frames 15, 17 may be defined on basis of geometric values (e.g. horizontal angle ±10° and vertical angle ±5°) in order to scan an area within the frames. Moreover, an area e.g. defined by one of the frames 15, 17 may be excluded from the surveying environment. By overlapping the rectangle frames 15, 17, a sector 16 is defined corresponding to a determinable area of the surveying environment. Thereafter, the target point verification is carried out merely in the selected sector 16 but not in the entire surveying environment. Furthermore, in the selected sector 16, additional target points can be selected by the user, or verified target points can be deselected, if they are not required. In order to facilitate the selection/deselection, it is possible to digitally or optically magnify the selected sector 16 and to display this magnified image on the display of the total station, on a second alternative display or on both displays, upon a command from the user.

Figure 6:
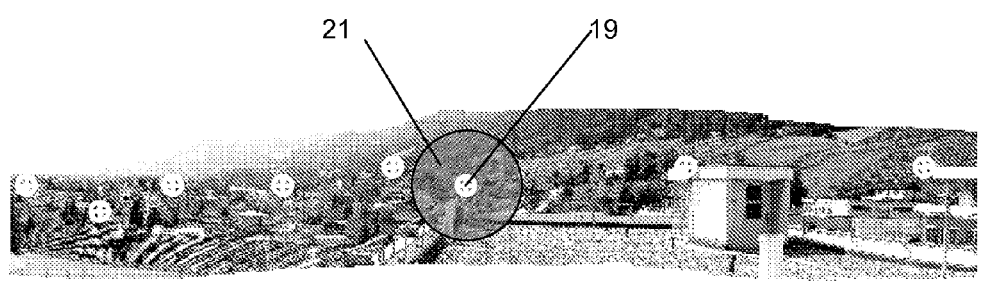
FIG. 6 is an image of the surveying environment of FIG. 3 with a picking tool for choosing certain target points.

An example for such a selection is shown in FIG. 6. Here a circle 21 on the display, which can be moved and positioned by the user, is used to chose a target point 19 for either selecting the same, in order to add it to the database or to deselect it, in order to remove it from the database. Similarly, the user can deselect one of the other target points displayed in the image of FIG. 6, if the respective target point is not required for the intended surveying process.

Due to the automatic target point recognition method, a time consuming prism search by the user can be avoided. Furthermore, since the target points are automatically selected, an erroneous aiming at an incorrect target point can be avoided, because all possible target points are detected before the surveying process begins. However, a correction with respect to adding or removing certain target points is nevertheless still possible.

What is claimed is:

1. A target point recognition method for an automatic search of target points in a surveying environment in advance of a precise measurement of these points, wherein an angle to the target points is measured with a surveying instrument, the surveying instrument comprising means for measuring angles, a camera and processing means for data storing and controlling the following steps in an automated manner after starting the search, the method comprising:
   a scanning procedure including:
      emitting electromagnetic radiation in form of a scanning beam to illuminate targets;
      moving the scanning beam within a predetermined angular range in order to scan the surveying environment;
      detecting reflections of the electromagnetic radiation on the targets, wherein the targets are defining the target points; and
      determining the angle to the target points,
   a capturing procedure including:
      capturing an overall image of the surveying environment, wherein the overall image comprises at least one single image taken by the camera; and
      detecting target points and determining their angle on the overall image by image processing by matching targets with one or more predetermined search criteria;
   storing the target points together with their angle in a data base; and
   displaying the overall image together with marks for indicating a position of the target points detected within the scanning procedure and the capturing procedure in the overall image;
   wherein
      the electromagnetic radiation is emitted in form of a laser fan to illuminate targets;
      the predetermined search criteria at least provide to detect a target representing a predetermined structure or pattern;

the scanning procedure and the capturing procedure are, as sub-procedures, part of a recognition process for detecting the target points; and the target points are displayed by using different marks captured by different sub-procedures of the recognition process with which the target point has been recognized.

2. The target point recognition method according to claim 1, wherein the angle to the target points measured includes a horizontal and a vertical angle.

3. The target point recognition method according to claim 1, wherein capturing the overall image of the surveying environment includes capturing several images and stitching the pictures together to generate a panoramic view.

4. The target point recognition method according to claim 1, wherein target points are manually verified and added to the data base and/or detected or verified target points are manually chosen and removed from the data base.

5. The target point recognition method according to claim 1, wherein a distance and angles to a target point are determined within a precise measurement, after manually or automatically selecting the target point.

6. The target point recognition method according to claim 1, wherein the scanning procedure and the capturing procedure are executed in an at least partly in time overlapping manner.

7. The target point recognition method claim 1, further comprising verifying the target point and gathering additional information of the target including pole height or reflector type by means of image processing.

8. The target point recognition method according to claim 1, wherein the scanning procedure and the capturing procedure are, as sub-procedures, part of a recognition process for detecting the target points, wherein the recognition process further comprises other sub-procedures, wherein the sub-procedures are performed by use of different sensor types including an automatic-target-recognition-sensor, an overview camera, an on-axes camera, a thermographical sensor and/or a range imaging module.

9. The target point recognition method according to claim 8, wherein the target points are displayed in combination with a virtual environment and/or in combination with the overall image of the surveying environment, in dependency of the search criteria used for determining the respective target point, wherein the size of the representing marks depends on the respective target points' distance from the surveying instrument.

10. The target point recognition method according to claim 1, wherein target point information, including their distance and angles to the surveying instrument, of some or all of the target points are transferred into an existing coordinate system.

11. The target point recognition method according to claim 1, wherein the search criteria provide to verify whether a target point is a retro-reflecting target and/or a signal emitting target and/or a target representing a predetermined structure or pattern and/or a temporarily-signalized target and/or a coded target and/or a half-corresponding target.

12. The target point recognition method according to claim 1, wherein a scanning of the surveying environment and/or a scanning within a predefined surveying area is performed by laser scanning or by moving the scanning beam within a predetermined angular range and/or the surveying environment is scanned rotating the scanning beam over a full circle providing at least a partial hemisphere.

13. The target point recognition method according to claim 1, wherein a scanning of the surveying environment and/or a scanning within a predefined surveying area defined by a frame is performed by laser scanning or by moving the scanning beam within a predetermined angular range and/or the surveying environment is scanned rotating the scanning beam over a full circle providing a full dome of the surveying environment.

14. The target point recognition method according to claim 1, wherein the processing means control the repeating of the steps of the method until the whole surveying environment is scanned and until a scan of the surveying environment is performed with each sensor type.

15. A surveying instrument comprising:
display means,
scanning means for emitting electromagnetic radiation in form of a scanning beam and for detecting reflections;
a distance measuring unit,
an angle determination unit;
a camera for capturing images;
a processing unit for image processing, data storing and providing a searching functionality for searching for target points, that are defined by targets, and measuring an angle, including a horizontal and a vertical angle, to the target points in advance of a precise measurement of these target points,
wherein, within the searching functionality, the processing unit is adapted to perform respectively and control the following steps in an automated manner:
a scanning procedure by use of scanning means including:
emitting electromagnetic radiation in form of a scanning beam in the form of a laser fan to illuminate targets;
moving the scanning beam within a predetermined angular range in order to scan the surveying environment;
detecting reflections of the electromagnetic radiation on the targets, wherein the targets are defining the target points; and
determining the angle to the target points;
a capturing procedure including:
capturing an overall image of the surveying environment, wherein the overall image comprises at least one single image taken by the camera, including several images stitched together to a panoramic view; and
detecting target points and determining their angle on the overall image by image processing by matching targets with one or more predetermined search criteria;
storing the target points together with their angle in a data base; and
displaying the overall image together with marks for indicating a position of the target points detected within the scanning procedure and the capturing procedure in the overall images;
wherein
the predetermined search criteria at least provide to detect a target representing a predetermined structure or pattern;
the scanning procedure and the capturing procedure are, as sub-procedures, part of a recognition process for detecting the target points; and
the target points are displayed by using different marks captured by different sub-procedures of the recognition process with which the target point has been recognized.

16. The surveying instrument according to claim 15, wherein target points are detected with at least an over-view camera or an automatic-target-recognition-sensor.

17. The surveying instrument according to claim 15, further comprising control means for manually selecting and/or deselecting target points.

18. The surveying instrument according to claim 15, wherein the scanning means comprises an electromagnetic radiation emitter for emitting a scanning beam, moving means for moving the scanning beam, a reflections detector for detecting reflections on the targets.

\* \* \* \* \*